(12) United States Patent
Heilbron et al.

(10) Patent No.: US 8,069,459 B2
(45) Date of Patent: Nov. 29, 2011

(54) METHOD, APPARATUS AND COMPUTER-READABLE MEDIUM FOR PROMOTING TELEVISION PROGRAMS

(75) Inventors: Maarten Boudewijn Heilbron, Toronto (CA); Peter Werner Ratsch, Toronto (CA); Wayne Snow, Mississauga (CA)

(73) Assignee: BCE Inc., Verdun, Quebec (CA)

( * ) Notice: Subject to any disclaimer, the term of this patent is extended or adjusted under 35 U.S.C. 154(b) by 851 days.

(21) Appl. No.: 12/038,461

(22) Filed: Feb. 27, 2008

(65) Prior Publication Data

US 2009/0172725 A1    Jul. 2, 2009

Related U.S. Application Data

(60) Provisional application No. 61/017,344, filed on Dec. 28, 2007.

(51) Int. Cl.
*H04N 7/10*    (2006.01)
*H04N 7/025*    (2006.01)
*H04N 7/173*    (2011.01)
*H04H 60/33*    (2008.01)

(52) U.S. Cl. ............... 725/32; 725/9; 725/105

(58) Field of Classification Search ............ 725/32, 725/34–36
See application file for complete search history.

(56) References Cited

U.S. PATENT DOCUMENTS

| | | | |
|---|---|---|---|
| 5,805,154 A | 9/1998 | Brown | |
| 6,698,020 B1 * | 2/2004 | Zigmond et al. | 725/34 |
| 6,725,461 B1 | 4/2004 | Dougherty et al. | |
| 6,978,470 B2 * | 12/2005 | Swix et al. | 725/32 |
| 7,631,331 B2 * | 12/2009 | Sie et al. | 725/46 |
| 2002/0087402 A1 | 7/2002 | Zustak et al. | |
| 2003/0007092 A1 | 1/2003 | Sonner et al. | |
| 2003/0037332 A1 * | 2/2003 | Chapin et al. | 725/35 |
| 2003/0233656 A1 * | 12/2003 | Sie et al. | 725/46 |
| 2004/0117819 A1 * | 6/2004 | Yu | 725/32 |
| 2005/0204387 A1 | 9/2005 | Knudson et al. | |
| 2006/0010476 A1 * | 1/2006 | Kelly et al. | 725/86 |
| 2006/0013556 A1 | 1/2006 | Poslinski | |
| 2006/0136980 A1 * | 6/2006 | Fulcher et al. | 725/134 |
| 2007/0162951 A1 * | 7/2007 | Rashkovskiy et al. | 725/134 |
| 2008/0127251 A1 * | 5/2008 | Wachtfogel et al. | 725/34 |
| 2008/0250445 A1 * | 10/2008 | Zigmond et al. | 725/32 |
| 2009/0172731 A1 * | 7/2009 | Heilbron et al. | 725/36 |
| 2009/0187939 A1 * | 7/2009 | Lajoie | 725/34 |

(Continued)

OTHER PUBLICATIONS

Concurrent Computer Corporation, "Concurrent Files Patent for Technology that Enables Broadband Operators to Improve VOD Marketing by Using Video to Sell More On-Demand Content", NCTA Booth #2733, Atlanta, Georgia, Apr. 30, 2004.

(Continued)

*Primary Examiner* — Scott Beliveau
*Assistant Examiner* — Alexander Q Huerta

(57) ABSTRACT

A method, which comprises: receiving from a provider of a first content stream an indication of a promotional time slot to be rendered available on the first content stream; accessing a program schedule indicative of television programs scheduled to begin airing on respective content streams at respective start times; consulting said schedule to identify at least one particular television program among those of said television programs scheduled to air on content streams provided by providers different from the provider of the first content stream and whose start times fall within a time window of acceptable viewability relative to the promotional time slot; and causing conveyance of an advertisement for the at least one particular television program during the promotional time slot.

55 Claims, 9 Drawing Sheets

U.S. PATENT DOCUMENTS

2009/0199230 A1  8/2009  Kumar et al.

OTHER PUBLICATIONS

Office Action issued by the United States Patent and Trademark Office on Aug. 19, 2010 in connection with U.S. Appl. No. 12/043,512, 11 pages.

Office Action issued by the United States Patent and Trademark Office on Dec. 15, 2010 in connection with U.S. Appl. No. 12/043,512, 13 pages.

Office Action issued on Jun. 16, 2011 in connection with U.S. Appl. No. 12/043,512, 11 pages.

* cited by examiner

| Time | Content Stream | | | |
| --- | --- | --- | --- | --- |
| | 16A | 16B | 16C | 16D PAY |
| 2pm | Sesame Street | The View | All my Children | NASCAR |
| 3pm | Telethon | Judge Judy | One Life to Live | |
| 4pm | | Geraldo | General Hospital | Adult Content |
| 5pm | News | Donahue | Dancing with the Stars | |
| 6pm | | People's Court | Lost | Boxing |
| 7pm | Entertainment Tonight | Heroes | The Bachelor | |
| 8pm | Soprano's | Prison Break | Entertainment Tonight | Die Hard (Movie) |

FIG. 2

| Content Stream | | | | | | | | | |
|---|---|---|---|---|---|---|---|---|---|
| Time | 16A | Category | 16B | Category | 16C | Category | 16D PAY | Category |
| 2pm | Sesame Street | Kids | The View | Talk | All my Children | Soap | NASCAR | |
| 3pm | Telethon | Special | Judge Judy | Talk | One Life to Live | Soap | NASCAR | |
| 4pm | Telethon | Special | Donahue | Talk | General Hospital | Soap | Adult Content | |
| 5pm | News | Prime | Geraldo | Talk | Dancing with the Stars | Reality | Boxing | Featuring Mohamed Ali |
| 6pm | News | Prime | People's Court | Reality | Lost | Drama | Boxing | Featuring Mohamed Ali |
| 7pm | Entertainment Tonight | Prime | Heroes | Drama | The Bachelor | Reality | Die Hard (Movie) | Featuring Bruce Willis |
| 8pm | Sopranos | Drama | Prison Break | Drama | Entertainment Tonight | Prime | Die Hard (Movie) | Featuring Bruce Willis |

FIG. 6

METHOD, APPARATUS AND COMPUTER-READABLE MEDIUM FOR PROMOTING TELEVISION PROGRAMS

CROSS-REFRENCE TO RELATED APPLICATION

The present application claims the benefit under 35 U.S.C. 119(e) of U.S. Provisional Patent Application Ser. No. 61/017,344, entitled "METHODS AND SYSTEMS FOR PROMOTING TELEVISION PROGRAMS", filed on Dec. 28, 2007, hereby incorporated by reference herein.

FIELD OF THE INVENTION

The present invention relates generally to the promotion of television programs and, more particularly, to the identification of television programs to be promoted during promotional time slots.

BACKGROUND

Television programs are an important source of information and entertainment in today's society. In the past, broadcast television dominated the airwaves. Simply put, a handful of major content providers would be allocated certain broadcast frequencies by the local authorities. Over the years, alternative methods of delivering television were invented, and television service providers, sometimes also referred to as broadcast distribution undertakings (BDUs) emerged. These included cable and satellite providers at first and, more recently, providers of Internet access and video-over-Internet. In a typical situation, a television service provider enters into an agreement with multiple broadcasters and other content providers to deliver their respective content to the television service provider's customers.

In some socio-demographic markets, a given content provider's content may be so sought after that distribution rights may be given to only those television service providers that are willing to pay a premium. Conversely, some geographic markets dominated by a small number of television service providers may present a must-have penetration opportunity for a given content provider. In the latter case, the given content provider may wish to entice target television service providers to carry a particular channel. One mechanism for achieving this consists of providing, to a given television service provider, certain promotional time slots for sale or internal use by the given television service provider and its affiliates. These time slots are sometimes referred to in the industry as "ad avails".

While ad avails provide a significant opportunity for television service providers to generate revenue and promote themselves (e.g., by advertising the content of their own channels), one of the problems with ad avails involves the time instants at which they are rendered available by the content provider. Specifically, ad avails tend to occur on an ad hoc basis. Consequently, ad avails are typically used to promote services that do not have a time-sensitive component. Alternatively, time-sensitive services may be promoted, but with unsatisfactory effects due to the randomness inherent in the time instants at which the ad avails occur.

Against this background, there is a need in the industry to harness greater potential from the use of ad avails despite their quasi-random nature, particularly in the promotion of television programs.

SUMMARY OF THE INVENTION

In accordance with a first broad aspect, the present invention seeks to provide a method, which comprises: receiving from a provider of a first content stream an indication of a promotional time slot to be rendered available on the first content stream; accessing a program schedule indicative of television programs scheduled to begin airing on respective content streams at respective start times; consulting said schedule to identify at least one particular television program among those of said television programs scheduled to air on content streams provided by providers different from the provider of the first content stream and whose start times fall within a time window of acceptable viewability relative to the promotional time slot; and causing conveyance of an advertisement for the at least one particular television program during the promotional time slot.

In accordance with a second broad aspect, the present invention seeks to provide a computer-readable medium comprising computer-readable program code which, when interpreted by a controller, causes the controller to execute a method. The computer-readable program code comprises first computer-readable program code for causing the controller to be attentive to receipt from a provider of a first content stream an indication of a promotional time slot to be rendered available on the first content stream; second computer-readable program code for causing the controller to access a program schedule indicative of television programs scheduled to begin airing on respective content streams at respective start times; third computer-readable program code for causing the controller to consult said schedule to identify at least one particular television program among those of said television programs scheduled to air on content streams provided by providers different from the provider of the first content stream and whose start times fall within a time window of acceptable viewability relative to the promotional time slot; and fourth computer-readable program code for causing the controller to cause conveyance of an advertisement for the at least one particular television program during the promotional time slot.

In accordance with a third broad aspect, the present invention seeks to provide an apparatus, comprising: means for receiving from a provider of a first content stream an indication of a promotional time slot to be rendered available on the first content stream; means for accessing a program schedule indicative of television programs scheduled to begin airing on respective content streams at respective start times; means for consulting said schedule to identify at least one particular television program among those of said television programs scheduled to air on content streams provided by providers different from the provider of the first content stream and whose start times fall within a time window of acceptable viewability relative to the promotional time slot; and means for causing conveyance of an advertisement for the at least one particular television program during the promotional time slot.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 2 is a non-limiting example of a program schedule that might be consulted by a service provider when implementing an embodiment of the present invention.

FIG. 6 is a non-limiting example of an upgraded version of the program schedule shown in FIG. 4.

It is to be expressly understood that the description and drawings are only for the purpose of illustration of certain embodiments of the invention and are an aid for understanding. They are not intended to be a definition of the limits of the invention.

DETAILED DESCRIPTION

Figure 1A:
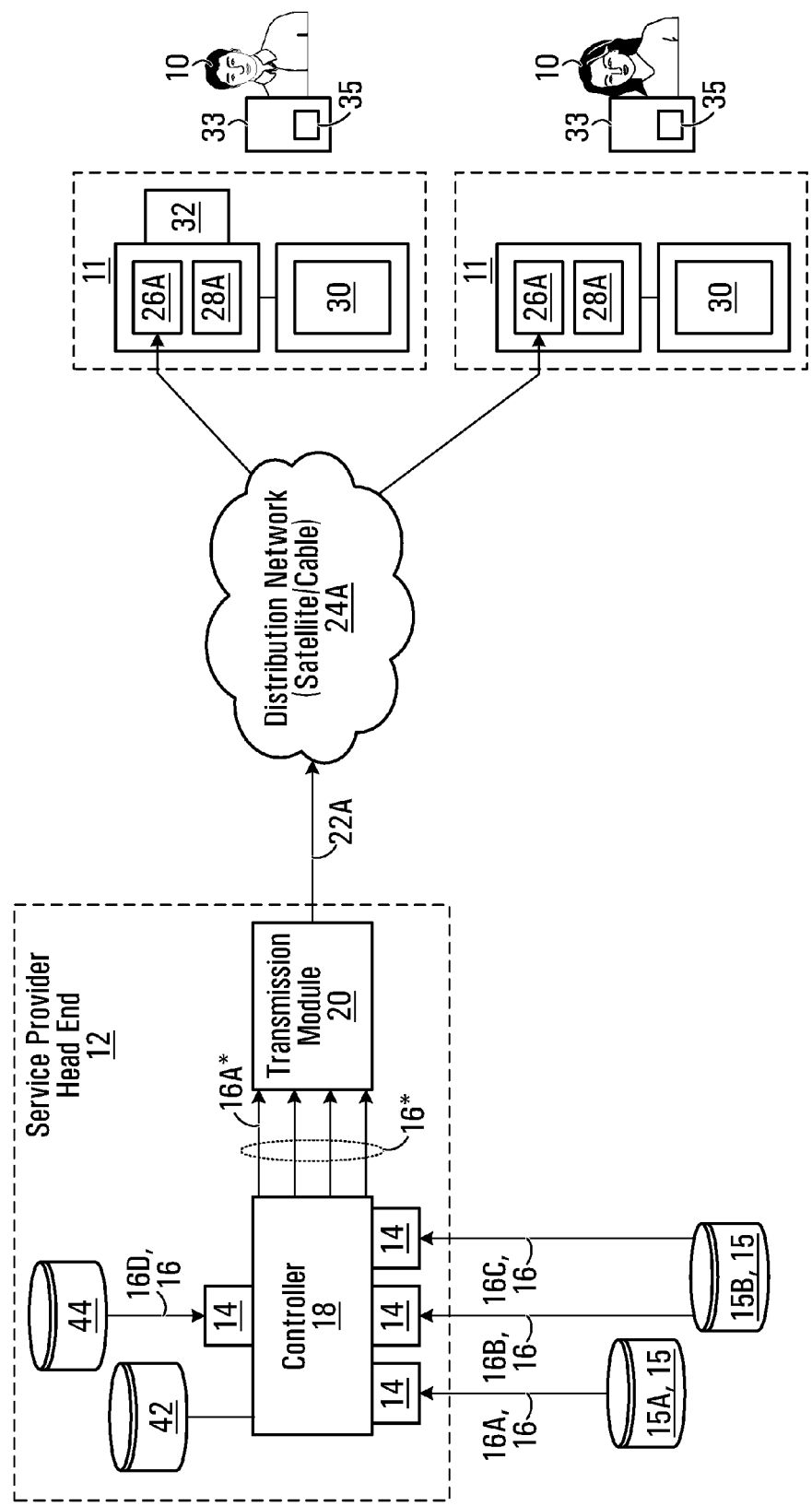
FIG. 1A is a block diagram of a television distribution system that provides television services to a plurality of viewers in accordance with a non-limiting example embodiment of the present invention.

Reference is made to FIG. 1A, which is a block diagram of a television distribution system that provides television services to a plurality of viewers 10 in accordance with a non-limiting example embodiment of the present invention. By way of non-limiting example, the provision of television services can be viewed as the provision of scheduled video content on multiple content streams (or channels). The television distribution system comprises a service provider head end 12 with various components managed or operated by a television service provider (hereinafter a "service provider"). The service provider head end 12 has a plurality of inputs 14 that receive content streams 16 supplied by a variety of content providers 15. Examples of content providers include, without limitations, broadcasters, studios and advertisers, to name a few non-limiting possibilities.

The content streams 16 (sometimes be referred to as "channels") may include well known channels such as CBC, CTV, Global, CNN, ABC, CBS, NBC, MSNBC, TSN, HBO and Discovery Channel, as well as other channels carrying scheduled video content (also referred to as "television programs") of various kinds. The content streams 16 may also include channels that are proprietary to, or affiliated with, the service provider. An example of a proprietary channel is a pay channel, which is rendered available to viewers who pay an additional fee to watch a certain type of programming such as a sports event, music concert or movie, for example.

In the example of FIG. 1A, the content streams 16 include a plurality of content streams, in this case content streams 16A, 16B, 16C and 16D. Each of the content streams 16A, 16B, 16C, 16D is provided by a particular one of the content providers 15. It is noted that some content providers 15 may be the source of more than one content stream. In the illustrated non-limiting example, content stream 16A is supplied by a content provider 15A, while content streams 16B and 16C are supplied by a content provider 15B. Content stream 16D is proprietary to the service provider, and is supplied by a content generation module 44 managed or operated by the service provider.

The service provider head end 12 also includes a controller 18 that comprises suitable hardware, software, circuitry and/or control logic configured to effect various functions. Specifically, the controller 18 may be configured to organize the content streams 16 for distribution to the viewers 10. For example, the content streams 16 may be formatted, coded, transcoded and/or processed in other ways by the controller 18 before the resulting content streams (hereinafter called processed content streams and denoted 16*) are provided to a transmission module 20. Additionally, while transforming the content streams 16 to the processed content streams 16*, the controller 18 may be configured to insert additional information into the content streams 16. Such additional information may consist of event markers, weather warnings and, as will be seen later on in greater detail, advertisements that promote television programs scheduled to air on other channels. Such advertisements are inserted by virtue of an ad selection process executed by the controller 18 and described later on in greater detail.

The transmission module 20 comprises suitable hardware, software, circuitry and/or control logic configured to output the processed content streams 16* in a format that is convenient for customer premises equipment 11 used by the viewers 10. The implementation of the transmission module 20 can take on various forms, depending on the nature of the television distribution system.

For instance, in the case where the television distribution system is a cable system or a satellite system as illustrated in FIG. 1A, the transmission system 20 implements multiplexing, modulation and various other signal processing functions. The output of the transmission system 20 is a signal 22A (which may be a multi-frequency signal) that is output over a suitable medium (i.e., coaxial cable or radio frequency). At this point, the signal 22A traverses a distribution network 24A on its way to the customer premises equipment 11. In the cable scenario, the distribution network 24A has a tree-like structure, where each branch of the tree terminates at the customer premises equipment 11 of a different viewer. In the satellite scenario, the distribution network 24A is defined by a coverage area dependent on satellite beams, and viewers with appropriate customer premises equipment 11 will be able to capture the beams and decode the content streams carried therein. In both scenarios, the customer premises equipment 11 comprises a receiver 26A (such as a cable modem or satellite dish) and a processing entity 28A.

Figure 1B:
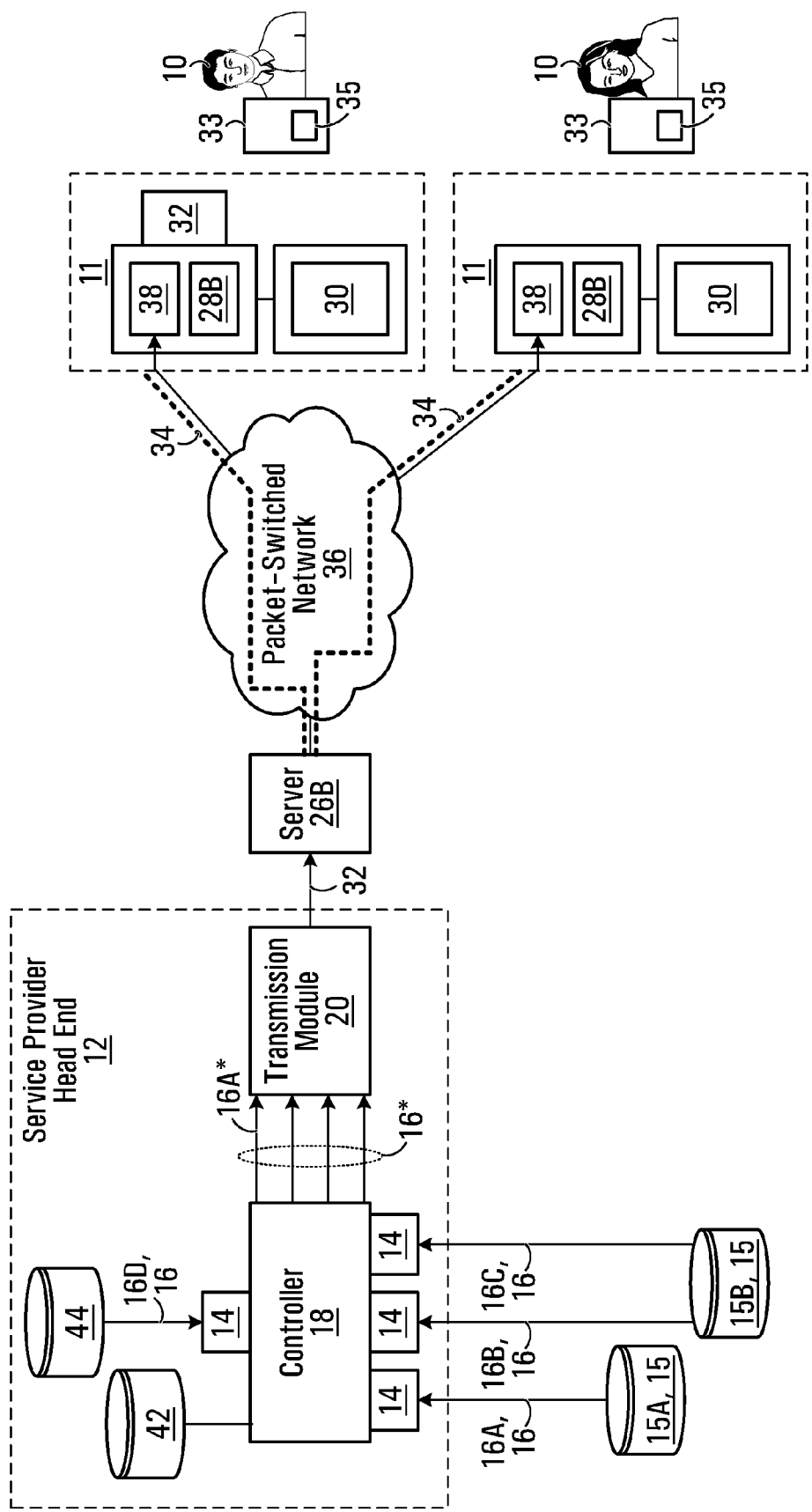
FIG. 1B is a block diagram of a television distribution system that provides television services to a plurality of viewers in accordance with another non-limiting example embodiment of the present invention.

On the other hand, in the case where the television distribution system is an IPTV or mobile wireless system as illustrated in FIG. 1B, the transmission module 20 implements packetization and other digital processing functions. The output of the transmission module 20 is a packet stream 32 containing the processed content streams 16*, which is sent over a communication link to a server 26B. The server 26B is still under the control of the service provider and is connected to each of the customer premises equipment 11 by a respective logical connection 34 over a packet-switched network 36 such as the Internet or a wireless network (e.g., Wi-Max, EDGE, EV-DO), for example. The server 26B determines, on a customer-by-customer basis, which of the processed content streams 16* to send to each customer premises equipment 11 at any given time. This is achieved by interaction between the server 26B and the customer premises equipment 11, which can include a transceiver 38 (such as an RF antenna, a modem, etc.) and a processing entity 28B.

In yet another scenario, which is applicable to a video-over-Internet system, the service provider does not provide the access medium over which the television programs are delivered to the customer. Rather, the Internet is used as a vehicle, and in this case the service provider interacts with individual customers over the Internet (i.e., behind the Internet service provider). Thus, the service provider simply compiles content streams from various sources on behalf of the customer and channels them to the customer over the customer's Internet connection. Such a scenario is particularly feasible where high-bandwidth Internet connections are consistently available. Those skilled in the art will appreciate that the video-over-Internet scenario is just one example where the delivery medium has been decoupled from the provider of television services. Other possibilities exist and are within the scope of the present invention. From the perspective of the various functionalities described below, the video-over-Internet scenario is akin to the IPTV and mobile wireless scenario and thus specific references to the video-over-Internet scenario will be omitted in the following for reasons of notational convenience and simplicity, but without limiting the scope of the present invention.

With reference now to both FIGS. 1A and 1B, and regardless of the nature of the television distribution system, the customer premises equipment 11 further comprises a display device 30 and an input interface 32. The display device 30 receives a signal from the processing device (28A or 28B, as the case may be), which is then converted into images by the display device 30 for the benefit of the viewer. By way of non-limiting example, the display device 30 can be a television monitor or computer screen.

The input interface 32 is configured to allow the viewer to effect a channel change, i.e., to change the content stream being viewed via the display device 30. This can be achieved by virtue of a remote control device 33, for example. Specifically, based on a "channel change command" (or a "content stream change command") received via the input interface 32, the processing entity 28A (in a cable or satellite scenario) causes a selected content stream to be conveyed via the display device 30. In such a case, the processing entity 28A causes the receiver 26A to selectively filter the signal 22A so as to admit the selected content stream, which is then processed by the processing entity 28A and output via the display device 30. On the other hand, when the channel change command is received via the input interface 32 in an IPTV or mobile wireless scenario, the processing entity 28B communicates with the server 26B over the packet-switched network 36 and via the transceiver 38 of the customer premises equipment 11. The processing entity 28B instructs the server 26B to change the content stream being delivered to the customer premises equipment 11 over the appropriate logical connection 34 so that it is thereafter the selected content stream.

In one embodiment, the channel change command received at the input interface 32 may explicitly convey the identity of the selected content stream. In another embodiment, the channel change command received at the input interface 32 amounts to a "switch to previous" command, whereby the selected content stream may be the content stream that had been viewed in the immediate past. Also, and as will be described in greater detail later on in this specification, certain channel change commands received at the input interface 32 may result in the selected content stream being a content stream whose identity had been transmitted from the service provider head end 12 along with an advertisement for a television program scheduled to air on that content stream.

With continued reference now to both FIGS. 1A and 1B, and with additional reference to FIG. 2, the service provider also has access to a program schedule 40, which may be provided by the service provider or a third party. The program schedule 40 outlines when specific television programs are scheduled to air on specific ones of the content streams 16. As such, each television program is associated with a specific content stream, a specific begin time and either a specific duration or a specific end time. As can be seen in FIG. 2, the program schedule 40 outlines various television programs scheduled to air on the various content streams 16A, 16B, 16C, 16D. Of course, the illustrated programs are merely examples, and not intended to limit the scope of the invention.

The program schedule 40 can be constructed based on individual per-channel schedules obtained from the various content providers 15 that supply the various content streams 16. The program schedule 40 could be stored locally at the service provider head end 12 in the form of a database 42 as shown in FIGS. 1A and 1B. Alternatively, the program schedule 40 could be accessible remotely, e.g., via a network such as the Internet.

Figure 3:
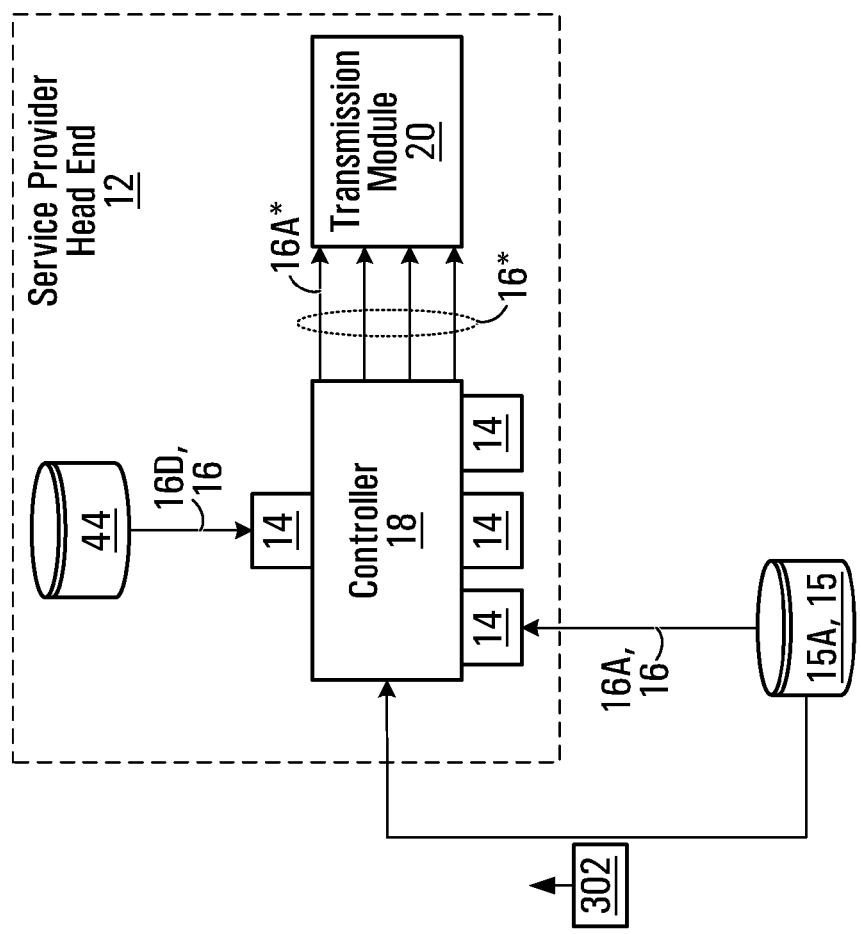
FIG. 3 illustrates provision of a content stream by a content provider.

Reference is now made to FIG. 3, depicting content provider 15A, which is assumed for the purposes of the present example to be responsible for supplying content stream 16A to one of the inputs 14 of the service provider head end 12. Content provider 15A sends a message 302 to the service provider (specifically, to the controller 18), which notifies the service provider of a promotional time slot to be rendered available on content stream 16A. The message 302, which concerns content stream 16A, may be sent in an out-of-band fashion (as illustrated in FIG. 3), namely along a signal path that is outside content stream 16A, and which may traverse a different network that is not part of the content distribution network 24A or the packet-switched network 36. Alternatively, the message 302 may be sent as part of content stream 16A, i.e., in an in-band fashion.

The message 302 includes information regarding the time when the promotional time slot will occur on content stream 16A. Such information may include an absolute time (e.g., "promotional time slot to begin at 08:15:00", or "promotional time slot begins now"), a time interval relative to the current time (e.g., "the promotional time slot to begin 24 seconds from now"), or a more abstract temporal representation (e.g., "promotional time slot will be the third commercial during the next commercial break"). It should be apparent that the length of time between receipt of the message 302 by the controller 18 and the beginning of the promotional time slot is controlled by content provider 15A, and this is beyond the control of the service provider. In various non-limiting examples, such length of time may range from seconds to minutes, and may vary widely from one promotional time slot to the next.

It should be appreciated that further messages similar to the message 302 may be received from content provider 15A as well as from other ones of the content providers 15 at time instants that may be unpredictable from the point of view of the service provider, such messages serving to notify the service provider of promotional time slots to be rendered available on various ones of the content streams 16.

Figure 4:
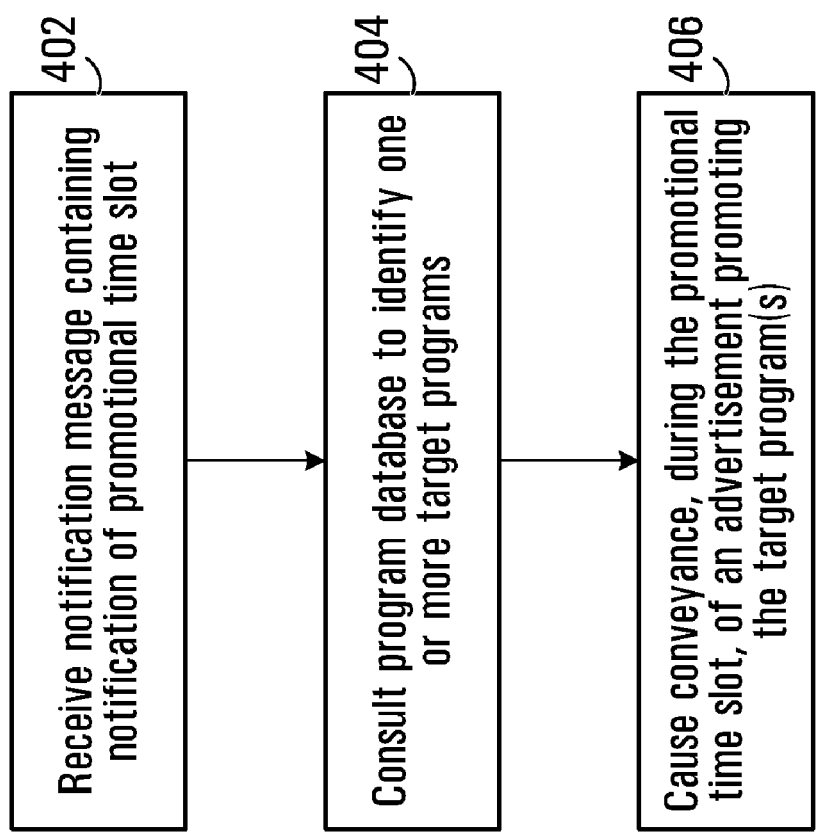
FIG. 4 is a flowchart illustrating an ad selection process executed by a controller in FIGS. 1A and 1B.

As mentioned earlier, the controller 18 executes an ad selection process that is now described with reference to the flowchart in FIG. 4. Specifically, at step 402, a notification message (such as the message 302) is received from a given content provider (such as content provider 15A). The notification message notifies the service provider of a promotional time slot to be rendered available on a given content stream (such as content stream 16A) supplied by the given content provider. At step 404, the controller 18 consults the program schedule 40 in order to identify one or more television programs to be promoted; such television programs are hereinafter referred to as "target programs". In accordance with an embodiment of the present invention, each such target program is a television program that is scheduled to air on a content stream provided from a content provider other than the given content provider. At step 406, the controller 18 causes conveyance of an advertisement during the promotional time slot, such advertisement promoting the target program(s).

The advertisement may take on a variety of forms. Assume for the moment that a single target program has been identified at step 404. Under a first option, the advertisement whose conveyance is caused at step 406 can comprise a pre-recorded advertisement stored in an ad database (not shown) on a per-program basis. Thus, execution of step 406 includes an additional step of accessing the ad database on the basis of the target program to identify the appropriate advertisement. When multiple target programs have been identified at step 404, then under a first option, the ad database can be consulted on the basis of the multiple target programs to identify multiple advertisements, which can then be combined into a single advertisement. Alternatively, the advertisements stored in the ad database may be multi-program advertisements, in which case a second option would be to consult the ad database on the basis of the multiple target programs to identify the appropriate multi-program advertisement.

In both the single- and multi-target-program cases, a further possibility is for the advertisement to comprise a textual message that can be pre-determined or generated dynamically. Still other possibilities are within the scope of the present invention.

For simplicity, the remainder of the specification will consider that there is a single target program that is identified at step 404. However, it should be appreciated that embodiments where multiple target programs are identified at step 404 are nevertheless within the scope of the present invention.

Those skilled in the art will appreciate that that it may in some cases be effective for the advertisement whose conveyance is caused at step 406 to include an indication of the content stream on which the target program is scheduled to air. Such content stream is hereinafter referred to as a "target content stream". In one embodiment, the indication is a perceptible media snippet (e.g., audio, video or text). In another embodiment, described in greater detail later on, the indication is a marker which is not intended to be perceived by the viewer of the advertisement but is detectable by the processing entity 28A, 28B.

As mentioned above, at step 404, the controller 18 consults the program schedule 40 in order to identify the target program. Certain selection criteria may be applied in the identification of the target program from a subset of all programs, which includes only those programs that are eligible for consideration as a target program.

Time Window of Viewability

Figure 5:
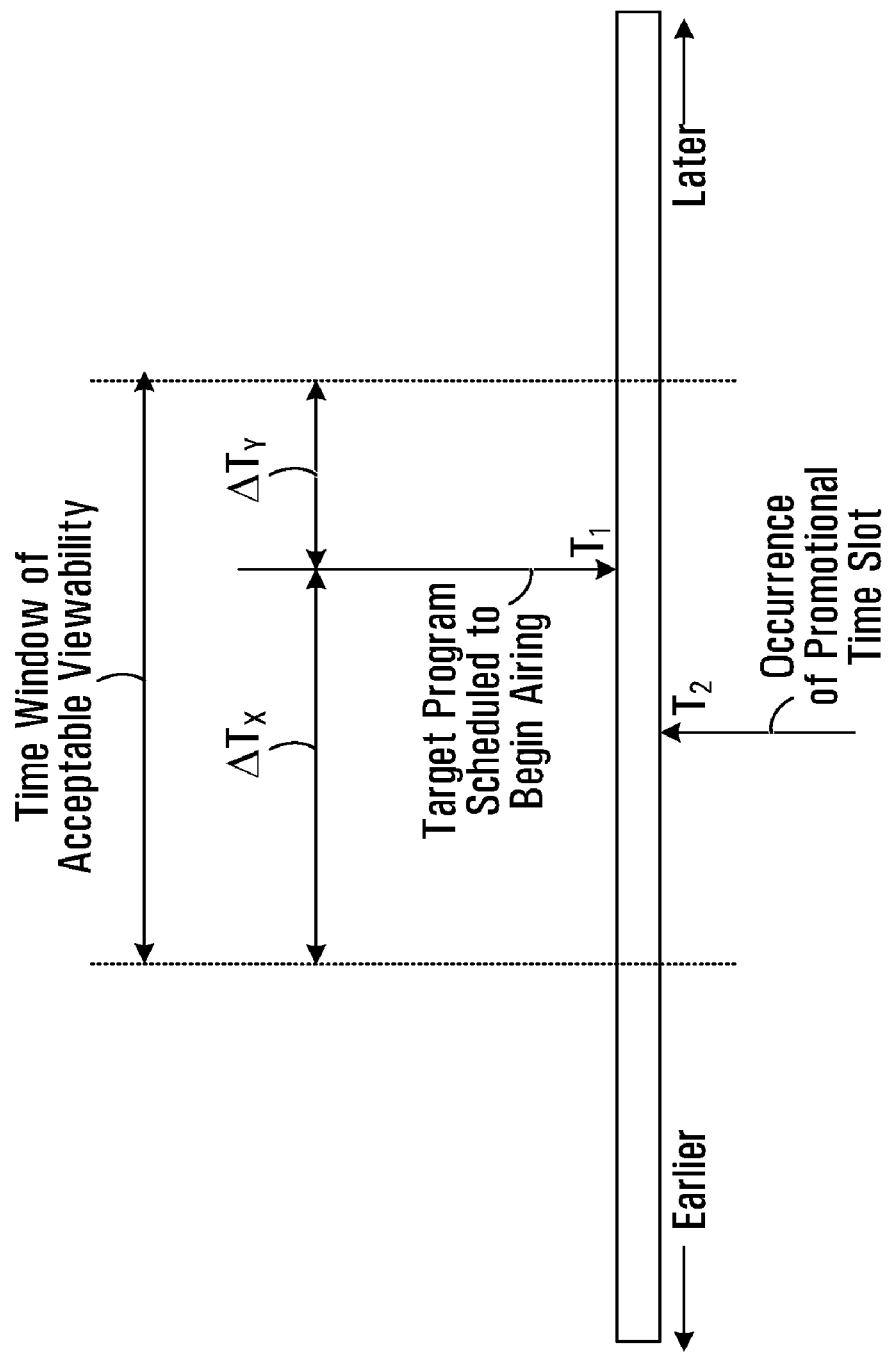
FIG. 5 depicts the concept of a time window of viewability, in accordance with a non-limiting embodiment of the present invention.

In one scenario, it may be of interest to relate the time at which the target program is scheduled to begin airing (hereinafter T1) to the time instant at which occurs the promotional time slot carrying the advertisement for the target program (hereinafter T2). For convenience, but without intending to limit the scope of the present invention, T2 may be viewed as the beginning of the promotional time slot. With reference now to FIG. 5, it may be useful to require that T1 fall within a "time window of acceptable viewability" 502 relative to T2, in order for a program to be eligible for consideration as a target program. The time window of acceptable viewability covers a period of time where, if the viewer were to switch to the target content stream following viewing of the advertisement promoting the target program, the viewer would be enticed to stay tuned to the target content stream. This beneficial situation can arise when the target program is about to start and the viewer is expected to still be paying attention (in which case T1>T2 and (T1−T2)<$\Delta T_X$) or when the target program has started but has not evolved to the point where the viewer would consider having missed an overly important portion (in which case T2>T1 and (T2−T1)<$\Delta T_Y$). Here, $\Delta T_X$ is representative of an attention span that a viewer is expected to have when switching over the target content stream before he/she is expected to become bored of waiting for the target program to begin, and this may vary according to factors such as programming category (e.g., children's versus adult, etc.). On the other hand, $\Delta T_Y$ is representative of an amount of time that a program can be under way before a viewer is expected to consider that it is too late to enjoy a satisfactory viewing experience of that program, and this may vary according to factors such as duration (e.g., a 1-hr drama versus a 5-hr footrace). It should be understood that $\Delta T_X$ and $\Delta T_Y$ are design parameters and may be independent of one another. Some experimentation is therefore permitted to achieve adequate performance. In some specific non-limiting embodiments, one may expect that $\Delta T_X$ could be set to 5, 15 or 30 minutes and $\Delta T_Y$ could be set to 5, 15 or 30 minutes to achieve satisfactory results. Of course, these are not to be considered limiting examples and any values of $\Delta T_X$ and $\Delta T_Y$ are considered to be within the scope of the present invention.

Eligible Content Stream

In addition, in order for a program to be eligible for consideration as a target program, it may need to be carried on a limited subset of content streams.

In a first example embodiment, the target program may be restricted to a program that is scheduled to air on one or more restricted content streams originating from the service provider. Non-limiting examples of restricted content streams may include pay channels, such as those carrying movies and sporting events for example. In such a case, the advertisement may be a promotional trailer for a movie, such promotional trailer lasting several seconds or minutes.

In a second example embodiment, a contractual relationship may exist between the content provider of the given content stream carrying the promotional time slot (say, content provider A) and the content provider of the target content stream being promoted by the advertisement placed into the promotional time slot (say, content provider B). In such a case, the service provider restricts its search for a target program to those programs scheduled to air on content streams supplied by content provider B. Thus, the service provider applies/enforces the contractual relationship between content provider A and content provider B.

Eligible Program Type

In addition, in order for a program to be eligible for consideration as a target program, it may need to be of a certain type. For example, and with additional reference to FIG. 6, let the program schedule 40 be upgraded to a program schedule 640, which includes, for each scheduled television program, a further indicator of a "programming category". The programming category could be as broad or as granular as operational considerations dictate. Examples of a general programming category, which may be applicable to broadcast distribution systems (e.g., cable, satellite), include: "children's programming", "sports", "adult drama", "food" and the like. An example of a customized programming category, which may be applicable to point-to-point distribution system (e.g., IPTV or mobile wireless), may include a narrow definition, such as: "any program featuring Bruce Willis". This and other customized programming categories could be defined by the service provider or it could be defined by the viewer, either over a back channel from the customer premises equipment 11 or over a separate link between the viewer and the service provider. In the latter case, the service provider may implement a dynamic personalization engine for the viewer to establish various customized programming categories. In a non-limiting example embodiment, the dynamic personalization engine could be accessed by the viewer over an Internet connection using a web browsing interface. Of course, where the program schedule 640 supports such customized programming categories, the controller 18 will be configured to conclude that, for example, a movie featuring Bruce Willis and a talk show featuring Bruce Willis both belong to the same customized programming category defined by "any program featuring Bruce Willis". Thus, overall, step 404 will consider exclusively those programs in the same programming category (whether general or customized), among which the target program will be identified.

Those skilled in the art will appreciate that the various above scenarios could be combined so as to yield a highly sophisticated ad selection process that takes into consideration factors such as scheduled begin time, programming category, duration, etc. relating to the ultimately selected target program.

Still, despite the above selection process that may be multifaceted, it is possible that two or more television programs remain eligible for promotion in a promotional time slot. Where only one candidate will emerge as the target program (considered to be one main realization of step 404), this situation can be termed a conflict, and the application of conflict resolution logic may be called for. Specifically, conflict resolution logic may in these circumstances cause selection of the target program to be effected on a basis of a value judgment that can take into account factors such as potential revenue, for example. An auction among the contenting content providers is another possibility. Such an auction would effectively be over the right to advertise their respective programs on the channel of another.

As mentioned above, the controller 18 causes conveyance of the advertisement during the promotional time slot. This is achieved by processing content stream 16A in a particular way (and outputting the corresponding one of the processed content streams 16*, denoted 16A*), depending on the nature of the promotional time slot and other considerations.

For example, the promotional time slot may occur during the airing of a commercial break (either during or after a particular television program) on content stream 16A. In this and other cases, the advertisement may be played back (in full screen mode) during the promotional time slot. Alternatively, in the case where the promotional time slot overlaps a television program currently airing on content stream 16A (e.g., during the rolling of credits at the end of the currently airing television program), and where the advertisement contains video (or a still image) and possibly also audio, the controller 18 can be configured to mix the video and possibly also audio from the advertisement with video and possibly also audio from the currently airing television program, or the still image could be superimposed over the video from the currently airing television program. This can be done by causing processed content stream 16A* to exhibit a split screen mode with the screen split into two portions, one carrying the currently airing television program and the other carrying the advertisement. For a text advertisement, it can be overlaid onto full screen video of the currently airing television program. In the case where the advertisement contains only audio, there is no need for video mixing; rather, the controller 18 can be configured to mix or replace the audio from the advertisement with audio from the currently airing television program.

The above techniques for conveyance of the advertisement are merely examples; other possibilities exist and are considered to be within the scope of the present invention.

It should be appreciated that if after the ad selection process has been executed, no target programs have been identified at step 404, then a generic advertisement can be conveyed in a conventional manner.

It should be appreciated that the viewer not only has the opportunity to view the advertisement during the promotional time slot, but is also provided with the opportunity to effect a semi-automatic channel change so as to switch to the target content stream which, it is recalled, carries the target program being promoted by the advertisement. In accordance with an embodiment of the present invention, in order to effect the semi-automatic channel change, the viewer is not required to know the identity of the target content stream, although it can be displayed or otherwise conveyed for additional effect.

Figure 7:
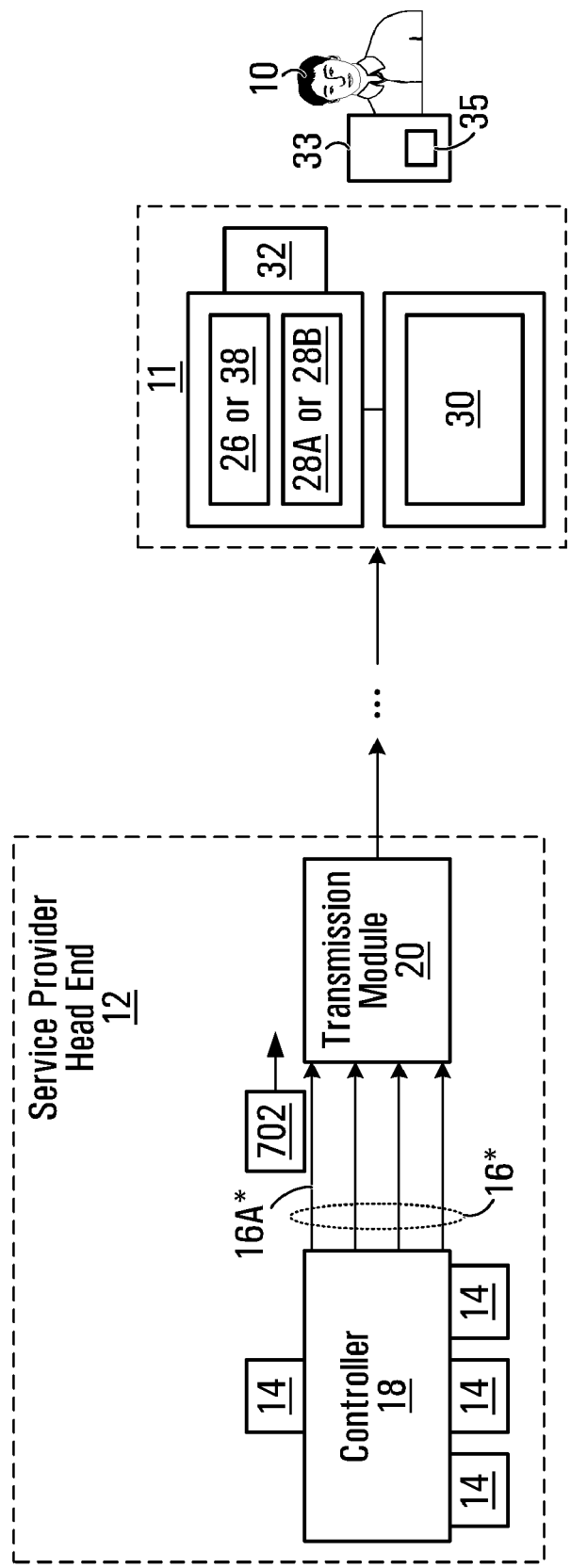
FIG. 7 is a block diagram applicable to FIGS. 1A and 1B and illustrative of a marker generated by a controller and transmitted with a processed content stream.

More specifically, reference is now made to FIG. 7, wherein the controller 18 generates a marker 702 that is transmitted along with processed content stream 16A*. Specifically, the controller 18, which places the advertisement that promotes the target program into the promotional time slot occurring on processed content stream 16A*, can also embed the marker 702 into the promotional time slot. Alternatively, the marker 702 can be generated and sent in advance of the promotional time slot. In both cases, the marker 702, which is sent along with processed content stream 16A*, includes the identity of the target content stream.

As an option, the controller 18 may alter the video or audio of the advertisement so that it contains an embedded invitation to the viewer to effect a semi-automatic channel change. In a simple case, the invitation may include audio and/or video resembling the following:

"click 'SELECT to go to this program"; or
"press '99' to go to this program'";

or any conceivable variant thereof. In some IPTV scenarios, it is envisaged that the invitation could be sent by the controller 18 specifically to the processing entity 28B in a point-to-point, out-of-band fashion rather than as a broadcast message embedded in the advertisement. In the above example, "SELECT" may refer to a dedicated hard button 35 on the remote control device 33 or to a soft button that is actionable by pressing an available—but temporarily specially programmed—hard button on the remote control device 33. In a more sophisticated case, the invitation may convey the name of the target program (in this example, "XYZ") and to this end may include audio and/or video resembling the following:

"click 'SELECT to go to program XYZ"; or
"press '99' to go to program XYZ'";

or any conceivable variant thereof. It should be appreciated that the invitation described above is not a necessary feature, particularly where the viewer is expected to know the inherent operation of the display device and remote control device 33 so as to effect a semi-automatic channel change without the provision of specific instructions via the display device 30.

Figure 8:
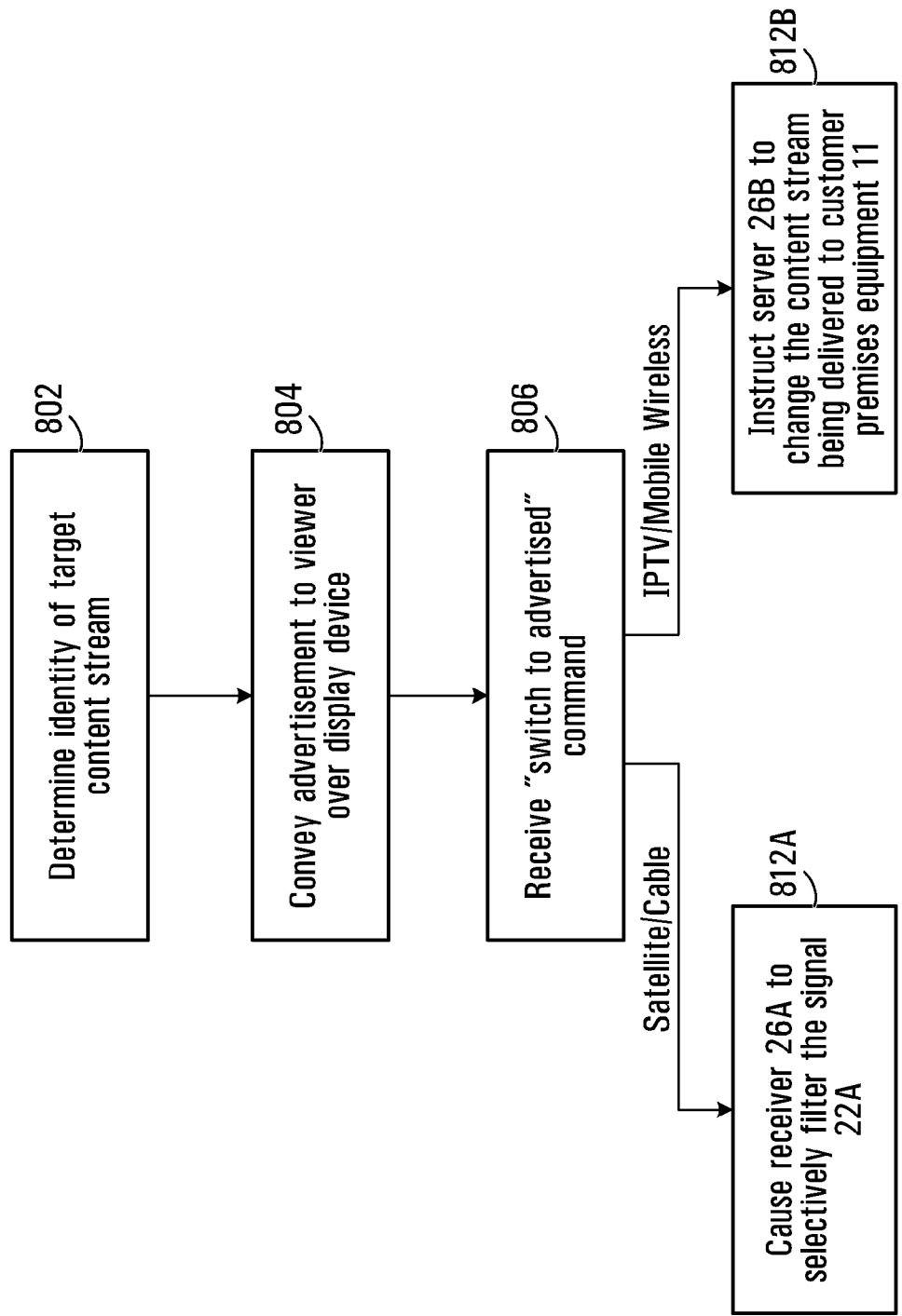
FIG. 8 is a flowchart illustrating steps in a process for effecting a channel change commanded by a viewer based on exposure to an advertisement promoting a particular television program.

Processed content stream 16A* containing the marker 702 (either in the promotional time slot or in advance of the promotional time slot), and also optionally containing the invitation to effect a semi-automatic channel change, then travels from the transmission module 20 to the customer premises equipment 11, ultimately reaching the processing entity 28A (or 28B) via the distribution network 24A (or the packet-switched network 36) and the receiver 26A (or the server 26B). Upon receipt of the marker 702 (which is contained in the promotional time slot or arrives slightly before the promotional time slot), the processing entity 28A or 28B executes a process now described in greater detail with reference to the flowchart in FIG. 8.

Specifically, at step 802, the processing entity 28A or 28B determines the identity of the target content stream based on the marker 702. Meanwhile, or shortly thereafter, at step 804, the advertisement is conveyed to the viewer over the display device 30. It is recalled that the advertisement is conveyed during the promotional time slot and promotes the target program that is scheduled to air on the target content stream. As mentioned above, the advertisement may include an explicit invitation to the viewer to effect a semi-automatic channel change; alternatively, the viewer may be aware that such an invitation is implicit.

At some point, let it be assumed that the viewer responds to the invitation to effect a semi-automatic channel change. For example, the viewer invokes a suitable "switch to advertised" command using the remote control device 33. As per some of the above examples, the "switch to advertised" command could be invoked by pressing "99" or pressing a "switch to advertised" hard or soft button. Other possibilities are of course within the scope of the present invention. The "switch to advertised" command is received via the input interface 32 at step 808, pursuant to which the processing entity 28A or 28B determines that a response to the invitation to effect a semi-automatic channel change has been provided by the viewer.

At step 812A, with the knowledge of the target content stream based on processing of the received marker 702, the processing entity 28A (in a cable or satellite scenario) causes the receiver 26A to selectively filter the signal 22A so as to admit the target content stream, which is then processed by the processing entity 28A and output via the display device 30.

In some embodiments of an IPTV or mobile wireless scenario, which is illustrated as step 812B, the processing entity 28B communicates with the server 26B over the packet-switched network 36 and via the transceiver 38 of the customer premises equipment 11, and instructs the server 26B to change the content stream being delivered to the customer premises equipment 11 so that it is thereafter the target content stream. In other embodiments of an IPTV or mobile wireless scenario, the controller 18 is continually aware of the content stream being requested by the customer premises equipment 11 and hence being viewed by the viewer. As a result, there is no need to send a marker to the customer premises equipment 11, since channel throttling is effectively executed at the controller 18. In such a case, the processing entity 28B still communicates with the server 26B over the packet-switched network 36 and via the transceiver 38 of the customer premises equipment 11; however, this direction of communication could simply be used to send to the server 26B a detected command to effect a semi-automatic channel change. Then, the server 26B determines the target program that it had been advertising on the content stream that was being viewed by the viewer, and thereafter switches its delivery to now be the target content stream.

It should be appreciated that the ability to enter conventional channel change commands using the remote control device 33 is not inhibited by embodiments of the present invention. Thus, a conventional channel change command (i.e., one that is not a "switch to advertised" command), but explicitly conveying the identity of the target content stream, may still be provided by the viewer and processed by the processing entity 28A or 28B.

As mentioned above, the controller 18 may alter the advertisement so that it contains an explicit invitation to the viewer to effect a semi-automatic channel change. This invitation, which it should be recalled is optional, may nevertheless take on more complex forms than those mentioned above. Specifically, the invitation may in fact reflect the selection criteria used at step 404 to identify the target program. For instance, where a selection criterion is a programming category (e.g., "adult drama"), the invitation may include audio and/or video resembling the following:

---
"click 'SELECT to get more adult drama"; or
"press '99' for more adult drama";
--- or any conceivable variant thereof. Where the selection criterion is customized (e.g., "any program featuring Bruce Willis"), the invitation may include audio and/or video resembling the following:

---
"click 'SELECT to see more Bruce Willis"; or
"press '99' for more Bruce Willis";
--- or any conceivable variant thereof. Where a single advertisement promotes multiple target programs (e.g., "Prison Break" on a first target content stream and "General Hospital" on a second target content stream), the invitation may include audio and/or video resembling the following:

"press '1' to go to Prison Break or press '2' to go to General Hospital";

or any conceivable variant thereof. Although there are two possibilities for a semi-automatic channel change in the above example, it is not necessary to go into detail about the operation of the processing entity 28A or 28B and other components since it would be within the purview of a person skilled in the art to modify the example process already set forth above to account for this special situation.

In the above examples, the ad selection process (depicted in FIG. 4) was described as being performed by the controller 18 in the service provider. That is to say, the service provider would be notified of upcoming promotional time slots and would be responsible for determining which television program to advertise in that promotional time slot. However, it should be appreciated that one or more elements of the ad selection process can be performed by the content provider (e.g., content provider A) that allows its promotional time slots (i.e., those appearing on its own content streams) to contain advertisements for television programs carried by other content providers (e.g., content provider B).

Indeed, content provider A may choose to, or be obliged by contract to, advertise the programs of content provider B on the promotional time slots made available by content provider A. A similar relationship could exist in the opposite direction. One possible application of this scenario could be continuity in programming for demographics that, at a given moment, are different on the two content streams originating from content provider A and content provider B. In order to render the above scenario feasible and actually effect the promotion, content provider A may advise the service provider as to what television program to advertise, when and on what channel. Little or no scheduling needs to be done by the service provider, as all of this work has been effected by content provider A and/or content provider B. All that the service provider needs to do is convey the requisite advertisement appearing on a given channel (from content provider A) at a given time.

Going one step further, another possibility is for content provider A to not only perform a selection process that results in the identification of a television program carried by content provider B, but also to fill the promotional time slot appearing in the relevant content stream (e.g., content stream 16A) with the selected advertisement. This would involve content provider A effecting the requisite audio and/or video mixing of the advertisement into content stream 16A. In this scenario, the service provider has no knowledge of the ad selection process and is merely used as a conduit for the content streams originating from content provider A, including content stream 16A which features the selected advertisement.

Continuing with the example scenario of where content provider A actually inserts the selected advertisement into the promotional time slot appearing in content stream 16A, it now becomes possible for content provider A to insert a marker (similar to the above-described marker 702) into the same content stream 16A. The marker can be embedded into the promotional time slot itself, or sent in advance of the promotional time slot. The marker, which one way or another is sent along with content stream 16A, includes the identity of the target content stream, namely the content stream that is scheduled to carry the television program being promoted by the selected advertisement.

Numerous potential revenue generating opportunities are thus created for content provider A as well as the service provider. In a first example, the controller 18 may maintain a log of its operation so as to track certain properties of the advertisements (i.e., which ones, how many, etc.) pertaining to target programs carried by content provider B that were promoted on the promotional time slots rendered available by content provider A. This log may be used to determine payment owed by content provider B to content provider A for use of the latter's promotional time slots. For example, payment may be based on the number of times that a certain program is promoted, the number of times that programs on a certain channel are promoted, etc.

In a second example of a revenue generating opportunity, it is possible to track the tendency of individual viewers to switch over to the target content stream. Specifically, in an IPTV or mobile wireless scenario, when the viewer expresses a desire to effect a channel change (either by issuing a "switch to advertised" command or a conventional channel change command), the server 26B is contacted by the processing entity 28B to change the content stream being delivered to the customer premises equipment 11. Recalling now that the server 26B is under the control of the service provider, it follows that the service provider knows which advertisement was being sent to the customer premises equipment 11 at the time that the channel change was effected. This allows the controller 18 and/or the server 26B to compile statistics regarding the tendency of viewers to switch to a content stream that is being promoted in an advertisement (which can be referred to as an advertisement success rate or a "click-through" rate).

Alternatively, when the viewer expresses a desire to effect a channel change (either by issuing a "switch to advertised" command or a conventional channel change command), the controller 18 and/or the server 26B can send this information to content provider A, which allows content provider A to compile statistics regarding the tendency of viewers to switch to a content stream that is being promoted in an advertisement (i.e., the advertisement success rate or "click-through" rate).

Similar functionality to that described in the preceding paragraph could be achieved in a satellite or cable scenario by way of a compilation of time instants at which channel changes are effected, as a result of receiving either a "switch to advertised" command or a conventional channel change command. Such compilation is followed by a return of the compiled data to the service provider over a back channel (e.g., established using a dialup modem/broadband modem in the case of a satellite system or cable modem in the case of a cable system). Content provider A could similarly effect such compilation. The service provider/content provider then does additional work to correlate the occurrence of channel changes to the content streams being promoted by advertisements that were aired at the times when such channel changes were effected. This allows the compilation of statistics (e.g., the click-through rate) similar to those that can be accumulated in real time in an IPTV or mobile wireless scenario, but requires that the service provider keep track of which advertisements promoting which content streams were aired at what times.

Alternatively, it is possible for each marker 702 generated by the controller 18 to be identified with an identifier. These identifiers are stored by the controller 18 for future use as will be described below. In addition, the identifier of a given marker 702 is sent together with the marker 702, so that the marker 702, which is sent along with a given target content stream (in the above example, this was 16A*), includes not only the identity of the target content stream but also its own identifier. In this scenario, the processing entity 28A or 28B receives the markers 702 (including the marker identifiers) and meanwhile monitors channel changes effected by the viewer, thereby to compile a list of marker identifiers corresponding to markers deemed to be in effect when channel changes were effected as by the viewer. Such a compilation of marker identifiers is followed by a return of the compiled data to the service provider over a back channel (in a satellite or cable scenario) or over a direct connection (in an IPTV or wireless scenario). The service provider then determines, from knowledge of the marker identifiers, which content streams were those being promoted by advertisements that were aired at the times when the channel changes were effected. This again allows the compilation of useful statistics such as the click-through rate for various commercial purposes.

In one example, the click-through rate, as well as other statistics obtained from monitoring the occurrence of channel changes, can be used in the calculation of remuneration sought by content provider A from content provider B for use of the content provider A's promotional time slots to promote television programs scheduled to air on content streams supplied by content provider B.

In another example, the click-through rate, as well as other statistics obtained from monitoring the occurrence of channel changes, can be used in evaluating the effectiveness of advertisements in enticing viewers to switch to the promoted television programs. For instance, where content provider B is the service provider itself and where the target content stream is a pay channel, and in the case where the promotional time slots are provided "free of charge" or at a flat rate to the service provider, then the click-through rate, as well as other statistics, can be used in evaluating the effectiveness of the advertisements in enticing viewers to switch to the pay channel.

Those skilled in the art will appreciate that in some embodiments, the functionality of the controller 18 and the processing module 28A (or 28B) may be implemented using pre-programmed hardware or firmware elements (e.g., application specific integrated circuits (ASICs), electrically erasable programmable read-only memories (EEPROMs), etc.), or other related components. In other embodiments, the functionality of the controller 18 and the processing module 28A (or 28B) may be achieved using a computing apparatus that has access to a code memory (not shown) which stores computer-readable program code for operation of the computing apparatus, in which case the computer-readable program code could be stored on a medium which is fixed, tangible and readable directly by the controller 18 and the processing module 28A (or 28B), (e.g., removable diskette, CD-ROM, ROM, fixed disk, USB drive), or the computer-readable program code could be stored remotely but transmittable to the controller 18 and the processing module 28A (or 28B) via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof.

While specific embodiments of the present invention have been described and illustrated, it will be apparent to those skilled in the art that numerous modifications and variations can be made without departing from the scope of the invention as defined in the appended claims.

What is claimed is:

1. A method, comprising:
   receiving from a provider of a first content stream an indication of a promotional time slot to be rendered available on the first content stream;
   accessing a program schedule indicative of television programs scheduled to begin airing on respective content streams at respective start times;
   consulting said schedule to identify at least one eligible television program, an eligible television program being a television program that is scheduled to air on a content stream provided by a provider different from the provider of the first content stream and whose start time falls within a time window of acceptable viewability relative to the promotional time slot; and
   causing conveyance of an advertisement for a target television program during the promotional time slot;
   wherein when two or more eligible television programs are scheduled to air on content streams provided by at least two providers different from the provider of the first content stream, the method further comprises selecting the target television program from among the two or more eligible television programs by determining a potential revenue associated with each of the two or more television programs, the target television program being a television program associated with the greatest potential revenue.

2. The method defined in claim 1, wherein the time window of acceptable viewability ends at a predefined time after the promotional time slot.

3. The method defined in claim 1, wherein the time window of acceptable viewability begins at a predefined time before the promotional time slot.

4. The method defined in claim 1, executed by an entity managed or operated by a television service provider different from the provider of the first content stream, wherein said consulting is restricted to those of said television programs scheduled to air on content streams that are provided by the television service provider.

5. The method defined in claim 4, wherein the content stream carrying the target television program is a pay channel provided by the television service provider.

6. The method defined in claim 5, wherein the target television program is a movie and wherein the advertisement includes a promotional trailer for said movie.

7. The method defined in claim 1, wherein said consulting is restricted to television programs scheduled to air on content streams that are provided by the provider of the content stream carrying the target television program.

8. The method defined in claim 7, wherein the provider of the first content stream is remunerated by the provider of the content stream carrying the target television program, based on conveyance of the advertisement.

9. The method defined in claim 7, wherein the provider of the first content stream and the provider of the content stream carrying the target television program have a pre-defined arrangement for remuneration of the provider of the first content stream by the provider of the content stream carrying the target television program, based on a number or frequency of advertisements conveyed during promotional time slots rendered available by the provider of the first content stream.

10. The method defined in claim 1, wherein the promotional time slot occurs during airing of a first television program falling into a particular programming category.

11. The method defined in claim 10, wherein said consulting is restricted to television programs falling into the particular programming category.

12. The method defined in claim 11, wherein the particular programming category is a service-provider-defined programming category.

13. The method defined in claim 11, wherein the particular programming category is a viewer-defined programming category.

14. The method defined in claim 1, further comprising obtaining said advertisement by consulting a database of advertisements on a basis of the target television program.

15. The method defined in claim 1, wherein said consulting results in identification of a plurality of eligible television programs to be promoted during the promotional time slot, the method further comprising obtaining said advertisement by consulting a database of advertisements on a basis of the plurality of eligible television programs.

16. The method defined in claim 1, wherein the promotional time slot occurs during airing of a first television program and wherein the advertisement contains video, the method further comprising mixing the video from the advertisement with video from the first television program.

17. The method defined in claim 16, wherein mixing comprises implementing a screen split between the first television program and the advertisement.

18. The method defined in claim 1, wherein the promotional time slot occurs during airing of a first television program and wherein the advertisement contains text, the method further comprising overlaying the text from the advertisement onto images from the first television program.

19. The method defined in claim 1, wherein the promotional time slot occurs during airing of a first television program and wherein the advertisement contains audio, the method further comprising mixing the audio from the advertisement with audio from the first television program.

20. The method defined in claim 1, wherein the promotional time slot occurs during a commercial break, the method further comprising playback of the advertisement in full screen mode during the promotional time slot.

21. The method defined in claim 1, further comprising generating an indication of the content stream carrying the target television program.

22. The method defined in claim 21, further comprising inserting into the advertisement the indication of the content stream carrying the target television program.

23. The method defined in claim 22, wherein the indication of the content stream carrying the target television program is in the form of a perceptible media snippet.

24. The method defined in claim 21, further comprising transmitting the indication of the content stream carrying the target television program to customer equipment in the form of a marker sent with the first content stream.

25. The method defined in claim 24, wherein the marker is transmitted to the customer equipment during the promotional time slot.

26. The method defined in claim 24, wherein the marker is transmitted to the customer equipment in advance of the promotional time slot.

27. The method defined in claim 24, further comprising obtaining an indication that a viewer has issued a command to effect a channel change consequent to transmission of the marker.

28. The method defined in claim 27, further comprising recording said indication for purposes of charging the provider of the content stream carrying the target television program.

29. The method defined in claim 27, further comprising recording said indication for purposes of evaluating an advertisement success rate.

30. The method defined in claim 1, further comprising generating an invitation to a viewer to effect a semi-automatic channel change and inserting said invitation into the advertisement.

31. The method defined in claim 30, wherein said invitation includes an audio, visual and/or text indication of the content stream carrying the target television program.

32. The method defined in claim 30, wherein the promotional time slot occurs during airing of a first television program falling into a particular programming category and wherein said invitation includes an audio, visual and/or text indication of the particular programming category.

33. The method defined in claim 30, further comprising obtaining an indication that a viewer has issued a command to effect the semi-automatic channel change.

34. The method defined in claim 33, further comprising recording said indication for purposes of charging the provider of the content stream carrying the target television program.

35. The method defined in claim 33, further comprising recording said indication for purposes of evaluating an advertisement success rate.

36. The method defined in claim 1, further comprising obtaining an indication that a viewer has issued a command to effect a channel change while viewing said advertisement.

37. The method defined in claim 36, further comprising recording said indication for purposes of charging the provider of the content stream carrying the target television program.

38. The method defined in claim 36, further comprising recording said indication for purposes of evaluating an advertisement success rate.

39. The method defined in claim 1, further comprising receiving from the provider of the first content stream a sequence of indications of respective promotional time slots to be rendered available on the first content stream.

40. The method defined in claim 39, wherein said indications are received at time instants that are non-deterministic.

41. The method defined in claim 40, wherein said promotional time slots follow their respective indications by unequal amounts of time.

42. A non-transitory computer-readable storage medium comprising computer-readable program code which, when interpreted by a controller, causes the controller to execute a method that comprises:
being attentive to receipt from a provider of a first content stream an indication of a promotional time slot to be rendered available on the first content stream;
accessing a program schedule indicative of television programs scheduled to begin airing on respective content streams at respective start times;
consulting said schedule to identify at least one eligible television program, an eligible television program being a television program that is scheduled to air on a content stream provided by a provider different from the provider of the first content stream and whose start time falls within a time window of acceptable viewability relative to the promotional time slot; and
causing conveyance of an advertisement for a target television program during the promotional time slot;
wherein when two or more eligible television programs are scheduled to air on content streams provided by at least two providers different from the provider of the first content stream, the method further comprises selecting the target television program from among the two or more eligible television programs by determining a potential revenue associated with each of the two or more television programs, the target television program being a television program associated with the greatest potential revenue.

43. An apparatus, comprising:
means for receiving from a provider of a first content stream an indication of a promotional time slot to be rendered available on the first content stream;
means for accessing a program schedule indicative of television programs scheduled to begin airing on respective content streams at respective start times;
means for consulting said schedule to identify at least one eligible television program, an eligible television program being a television program that is scheduled to air on a content stream provided by a provider different from the provider of the first content stream and whose start time falls within a time window of acceptable viewability relative to the promotional time slot; and
means for causing conveyance of an advertisement for a target television program during the promotional time slot; and
selection means, wherein when two or more eligible television programs are scheduled to air on content streams provided by at least two providers different from the provider of the first content stream, the selection means selects the target television program from among the two or more eligible television programs by determining a potential revenue associated with each of the two or more television programs, the target television program being a television program associated with the greatest potential revenue.

44. A method, comprising:
receiving from a provider of a first content stream an indication of a promotional time slot to be rendered available on the first content stream;
accessing a program schedule indicative of television programs scheduled to begin airing on respective content streams at respective start times;
consulting said schedule to identify at least one eligible television program, an eligible television program being a television program that is scheduled to air on a content stream provided by a provider different from the provider of the first content stream and whose start time falls within a time window of acceptable viewability relative to the promotional time slot; and
causing conveyance of an advertisement for a target television program during the promotional time slot;
wherein when two or more eligible television programs are scheduled to air on content streams provided by at least two providers different from the provider of the first content stream, the method further comprises selecting the target television program from among the two or more eligible television programs by conducting an auction among the at least two providers, the target television program being a television program scheduled to air on a content stream provided by the winner of the auction.

45. The method defined in claim 44, wherein the time window of acceptable viewability ends at a predefined time after the promotional time slot.

46. The method defined in claim 44, wherein the time window of acceptable viewability begins at a predefined time before the promotional time slot.

47. The method defined in claim 44, further comprising generating an indication of the content stream carrying the target television program.

48. The method defined in claim 47, further comprising inserting into the advertisement the indication of the content stream carrying the target television program.

49. The method defined in claim 48, wherein the indication of the content stream carrying the target television program is in the form of a perceptible media snippet.

50. The method defined in claim 47, further comprising transmitting the indication of the content stream carrying the target television program to customer equipment in the form of a marker sent with the first content stream.

51. The method defined in claim 50, wherein the marker is transmitted to the customer equipment during the promotional time slot.

52. The method defined in claim 50, wherein the marker is transmitted to the customer equipment in advance of the promotional time slot.

53. The method defined in claim 44, further comprising generating an invitation to a viewer to effect a semi-automatic channel change and inserting said invitation into the advertisement.

54. The method defined in claim 53, wherein said invitation includes an audio, visual and/or text indication of the content stream carrying the target television program.

55. A non-transitory computer-readable storage medium comprising computer-readable program code which, when interpreted by a controller, causes the controller to execute a method that comprises:
being attentive to receipt from a provider of a first content stream an indication of a promotional time slot to be rendered available on the first content stream;
accessing a program schedule indicative of television programs scheduled to begin airing on respective content streams at respective start times;
consulting said schedule to identify at least one eligible television program, an eligible television program being a television program that is scheduled to air on a content stream provided by a provider different from the provider of the first content stream and whose start time falls within a time window of acceptable viewability relative to the promotional time slot; and
causing conveyance of an advertisement for a target television program during the promotional time slot;
wherein when two or more eligible television programs are scheduled to air on content streams provided by at least two providers different from the provider of the first content stream, the method further comprises selecting the target television program from among the two or more eligible television programs by conducting an auction among the at least two providers, the target television program being a television program scheduled to air on a content stream provided by the winner of the auction.

* * * * *